United States Patent
Chiarella et al.

(10) Patent No.: US 10,944,869 B2
(45) Date of Patent: Mar. 9, 2021

(54) AUTOMATING ACTIONS OF A MOBILE DEVICE DURING CALLS WITH AN AUTOMATED PHONE SYSTEM

(71) Applicant: INTERNATIONAL BUSINESS MACHINES CORPORATION, Armonk, NY (US)

(72) Inventors: Giacomo G. Chiarella, Hampshire (GB); Daniel T. Cunnington, Hursley (GB); Eunjin Lee, Hampshire (GB); John J. Wood, Hertfordshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/296,285

(22) Filed: Mar. 8, 2019

(65) Prior Publication Data

US 2020/0288015 A1 Sep. 10, 2020

(51) Int. Cl.
*H04M 3/51* (2006.01)
*H04M 1/725* (2006.01)

(52) U.S. Cl.
CPC ..... *H04M 3/5166* (2013.01); *H04M 1/72538* (2013.01)

(58) Field of Classification Search
CPC .................. H04M 3/5166; H04M 1/72538
USPC ...... 379/265.02, 242, 265.01, 265.05, 88.01, 379/88.03
See application file for complete search history.

(56) References Cited

U.S. PATENT DOCUMENTS

| | | |
|---|---|---|
| 5,533,108 A | 7/1996 | Harris et al. |
| 7,606,714 B2 | 10/2009 | Williams et al. |
| 8,467,518 B2 | 6/2013 | Blair |
| 9,264,545 B2 | 2/2016 | Odinak |
| 2006/0217978 A1 | 9/2006 | Mitby et al. |
| 2008/0181371 A1 | 7/2008 | Merrow et al. |
| 2012/0008754 A1* | 1/2012 | Mukherjee .............. G10L 15/22 379/88.18 |
| 2015/0244863 A1* | 8/2015 | Dahan ................. H04M 3/4938 379/88.01 |
| 2017/0085710 A1 | 3/2017 | Wyss et al. |
| 2018/0249006 A1* | 8/2018 | Dowlatkhah ........ H04B 7/0417 |

OTHER PUBLICATIONS

Diaz, Julian "How Machines Learning is helping Call Centres improve the Customer Experience", Principal A Transaction Capital Company; http://insights.principa.co.za/how-machine-learning-is-helping-call-centres-improve-customer-experience; May 18, 2017; 4 pgs.

(Continued)

*Primary Examiner* — Thjuan K Addy
(74) *Attorney, Agent, or Firm* — Cantor Colburn LLP; Teddi Maranzano

(57) ABSTRACT

Embodiments include methods, systems and computer program products for automating actions of a mobile device during a call with an automated phone system. Aspects include determining that a phone call is being made to the automated phone system from the mobile device. Aspects also include obtaining automation information for the phone call. Based at least in part on the automation information, aspects include automatically performing at least one of providing data to the automated phone system and executing an action on the mobile device.

15 Claims, 4 Drawing Sheets

(56) References Cited

OTHER PUBLICATIONS

Nappy, Tayler "Creating a contact enter that analyzes phone calls and voice recordings using Haven OnDemand", https://community.havenondemand.com/t5/Blog/Creating-a-contact-center-that-analyzes-phone-calls-and-voice/ba-p/3141; Jul. 14, 2016; edited Aug. 23, 2016; 3 pgs.
VOICE2PHONE Outbound Calling System "Automated Calling System is great for repetitive robo-calls to the same phone numbers", https://voice2phone.com/blog/automated-calling-system-is-great-for-repetitive-robo-calls-to-the-same-phone-numbers; Apr. 22, 2013; 2 pgs.
GOOGLE Play "Phone-Apps on Google Play", retrieved at: https://play.google.com/store/apps/details?id=com.google.android.dialer&hl=en; downloaded Jun. 8, 2020; 3 pgs.
SmartAction "Virtual Agents for Call Center Automation" retrieved at: https://www.smartaction.ai/; downloaded Jun. 8, 2020; 6 pgs.
Tran, Thien Khai "SentiVoice—a system for querying hotel service reviews via phone", Abstract Only, The 2015 IEEE RIVF International Conference on Computing & Communication Technologies—Research, Innovation, and Vision for Future (RIVF); Date of Conference: Jan. 5-28, 2015; added to IEEE Xplore: Feb. 26, 2015; 1 pg.

\* cited by examiner

AUTOMATING ACTIONS OF A MOBILE DEVICE DURING CALLS WITH AN AUTOMATED PHONE SYSTEM

BACKGROUND

The present invention relates generally to controlling a mobile device, and more specifically, to automatically performing actions on a mobile device based on a determination that the mobile device is placing a call to an automated phone system.

Automated phone systems have become increasingly popular. Individuals often use automated phone systems to check bank or credit card balances, to pay utility bills, to participate in teleconferences and for a wide variety of other activities. In many cases, the input that the user provides to the automated phone system is always the same. For example, a user calling into an automated phone system of their bank may always have to input their account number.

SUMMARY

An embodiment of a computer implemented method for automating actions of a mobile device during a call with an automated phone system is provided. The method includes determining that a phone call is being made to the automated phone system from the mobile device. The method also includes obtaining automation information for the phone call. Based at least in part on the automation information, the method includes automatically performing at least one of providing data to the automated phone system and executing an action on the mobile device.

An embodiment of a computer program product for performing a processing action includes a computer readable storage medium having program instructions embodied therewith is provided. The program instructions readable by a processing circuit to cause the processing circuit to determine that a phone call is being made to the automated phone system from the mobile device. The program instructions readable by a processing circuit to also cause the processing circuit to obtain automation information for the phone call. Based at least in part on the automation information, the program instructions readable by a processing circuit to further cause the processing circuit to automatically perform at least one of providing data to the automated phone system and executing an action on the mobile device.

An embodiment of a mobile device for performing a processing action is provided. The mobile device includes a touch sensor configured to receive an input from a user and a processing device. The processing device is configured to determine that a phone call is being made to the automated phone system from the mobile device. The processing device is also configured to obtain automation information for the phone call. Based at least in part on the automation information, the processing device is further configured to automatically perform at least one of providing data to the automated phone system and executing an action on the mobile device.

BRIEF DESCRIPTION OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

DETAILED DESCRIPTION

Apparatuses, systems, and methods are provided for automating actions of a mobile device during a call with an automated phone system. In exemplary embodiments, the actions taken by a user during phone calls with an automated phone system are analyzed and during subsequent calls with the automated phone system one or more actions performed by the user are automatically performed by the mobile device. In one embodiment, the automated action includes providing data in response to a prompt from the automated phone system. For example, if the automated phone system is a conference call line that the user regularly dials and enters the same passcode, the automated action includes transmitting the passcode to the automated phone system. In another example, the automated action includes launching an application on the mobile device to obtain data from the application and optionally providing that data to the automated phone system. In yet another example, the automated action includes changing the display screen of the mobile device to a data input screen. For example, if the automated phone system is a conference call line that the user regularly dials into but which the user enters different passcodes, the automated action includes changing the display of the mobile device to be the data input screen for inputting the passcode.

In exemplary embodiments, a mobile device is configured to record the audio incoming during a phone call. When the same phone number is called again, the mobile device will record the audio again and compare it to the previous call. If the same audio data always comes through (same pitch, tone, voice, and information) then the mobile device will store an indication that the phone number is associated with an automated phone system. Using natural language recognition and machine learning, the mobile device will learn how the user interacts with the mobile device during the call with the automated phone system and determine if the interactions are repetitive. The mobile device creates automation information based on identified repetitive interactions. The automation information is used by the mobile device during subsequent calls to the phone number associated with the automated phone system.

Figure 1:
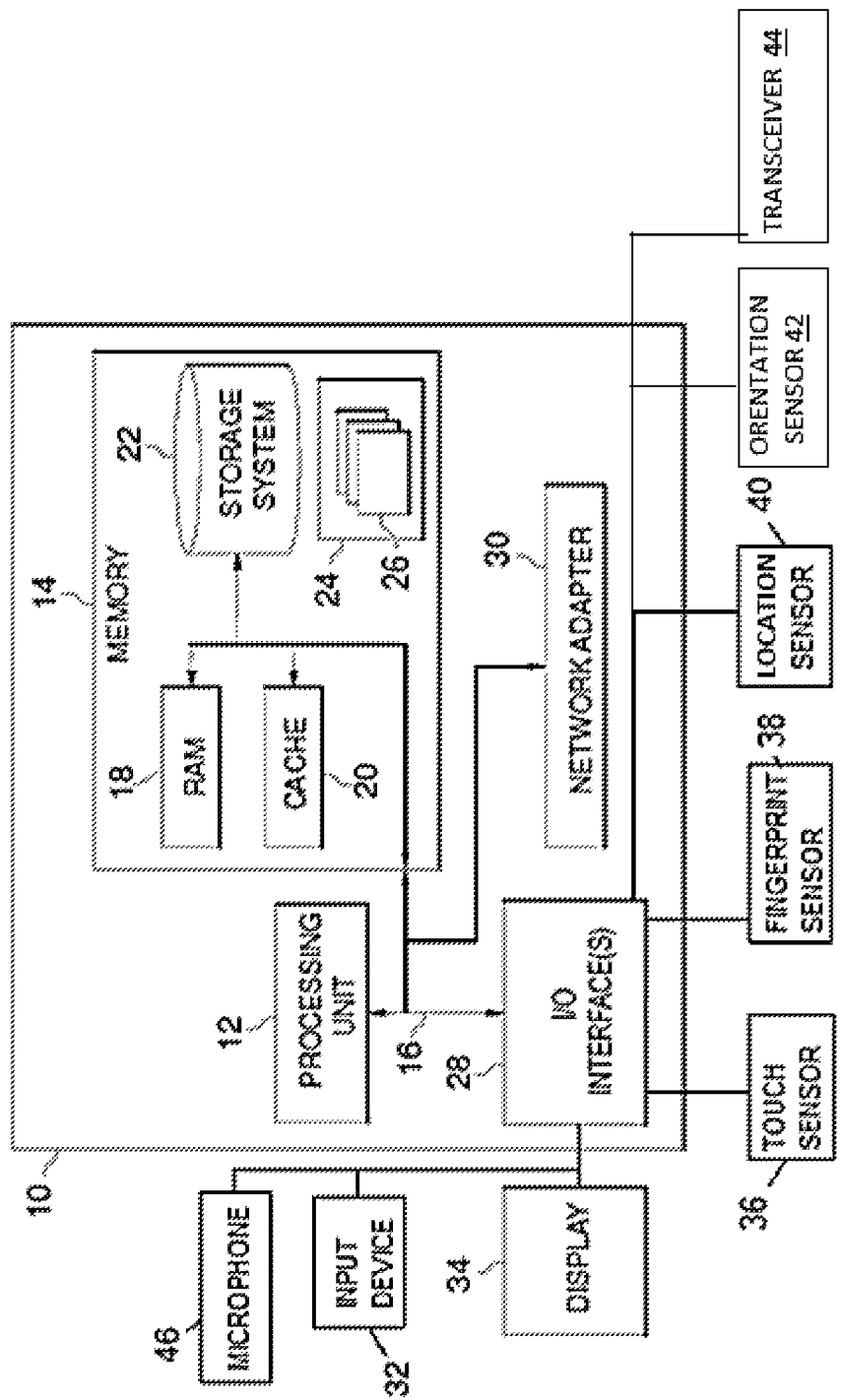
FIG. 1 depicts a block diagram of a mobile device in accordance with an embodiment.

FIG. 1 illustrates an example of a mobile device 10 that can be used to perform various actions, including receiving and processing user inputs and performing various processing actions as described herein, including storing and processing data, executing programs and displaying information. The mobile device 10 may be configured to receive or gather communications (e.g., data, text, spoken words, emails, authentication information, etc.) from other locations, such as a network (e.g., Internet) and/or another processor (e.g., server, computer or mobile device). The mobile device 10 may be any device capable of receiving user input, performing processing actions and displaying text and other information to a user, such as a mobile device (e.g., a smartphone), a wearable device (e.g., a smartwatch and/or fitness tracker), a tablet computer, a laptop computer, a desktop computer, a mainframe a server and others.

The mobile device 10 includes various components and/or modules for performing various processing, sensing and display functions. The mobile device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The mobile device 10 may also include other removable/non-removable, volatile/non-volatile computer system storage media. For example, the memory 14 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The mobile device 10 includes or is connected to various components, which may be incorporated in the mobile device 10 or external to the mobile device 10. The mobile device 10 includes interfaces 28 for communication with components and may also include a network adapter 30 for communication with other devices or components over a suitable network or remote connection. The mobile device 10 is connected to or includes at least one input device 32 such as a keyboard, button, mouse and/or touchscreen, and a display 34. The components shown in FIG. 1 and described herein are provided for illustrative purposes and are not intended to be limiting.

The mobile device 10 also includes a touch sensor 36 that is configured to detect contact and/or pressure from a user, e.g., via one or more fingers and/or other input devices such as styluses. The touch sensor 36 detects not only finger position, but also movements along a touchscreen. Movements of a finger or finger used an input to the mobile device 10 are referred to herein as movements, motions or swipes. In this way, the touch sensor 36 may be used by the mobile device 10, e.g., in conjunction with other input devices and program modules 26, to recognize an input performed by a user. Any suitable type of touch sensor 36 may be included in the device. For example, the touch sensor 36 is a capacitive or acoustic wave sensor. The touch sensor 36 may be located under a touchscreen or embedded within the touchscreen (e.g., between screen layers).

The mobile device 10 also includes a biometric finger pattern sensor 38 that is configured to detect characteristics of the user's fingers, such as a fingerprint, portion of a fingerprint, or another characteristic that allows, e.g., identification of a user and/or differentiation between the individual fingers of a user. Such characteristics, whether utilized individually or in combination, are referred to herein as "finger patterns." A "finger pattern" refers to any detectable feature or features, or any other identifying information detected by the finger pattern sensor that can be used to identify characteristics of individual fingers of a user's hand and/or differentiate between fingers.

Various other components may be incorporated in the mobile device 10. For example, a location sensor 40 can be used for determining the location of the mobile device 10. An orientation sensor 42 can be used for determining the orientation of the mobile device 10. The orientation can include whether the mobile device is in a landscape or portrait orientation and can also include determining if the mobile device is being held by the user. The transceiver 44 is configured to directly communicate with one or more electronic devices via any known protocol, such as Bluetooth. The one or more electronic devices can include a speaker or headset, a smartwatch, a television, a computer, an automobile, or the like. A microphone 46 or other sound recording device may be included for recording voice commands and recording changes in voice or other audible indicators.

Figure 2:
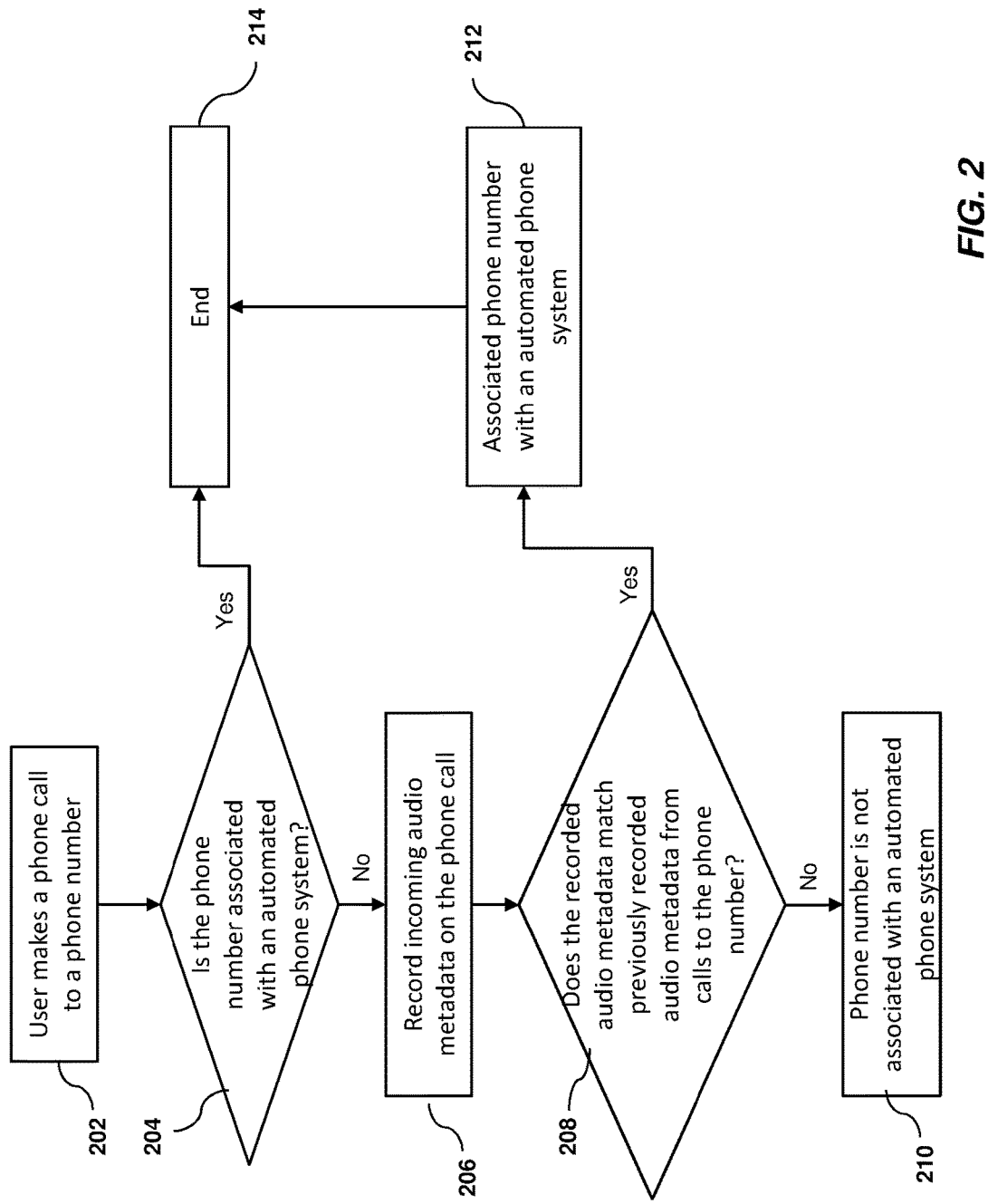
FIG. 2 depicts a flow diagram of a method for determining whether a phone call involves an automated phone system in accordance with an embodiment.

Referring now to FIG. 2, an embodiment of a method 200 for determining whether a phone call involves an automated phone system is shown. As illustrated at block 202, the method 200 includes a user making a phone call to a phone number. Next, as shown at decision block 204, the method 200 includes determining if the phone number is associated with a known automated phone system. If so, the method 200 proceeds to block 214 and ends. Otherwise, the method 200 proceeds to block 206 and includes recording incoming audio metadata on the phone call. In exemplary embodiments, audio metadata includes a tone, a pitch, a cadence and a volume of the audio as a function of time. Next, as shown at decision block 208, the method 200 includes determining if the recorded audio metadata matches previously recorded audio metadata from calls to the phone number. If so, the method 200 proceeds to block 212 and includes associated the phone number with an automated phone system. Otherwise, the phone number is not associated with an automated phone system, as shown at block 210.

Figure 3:
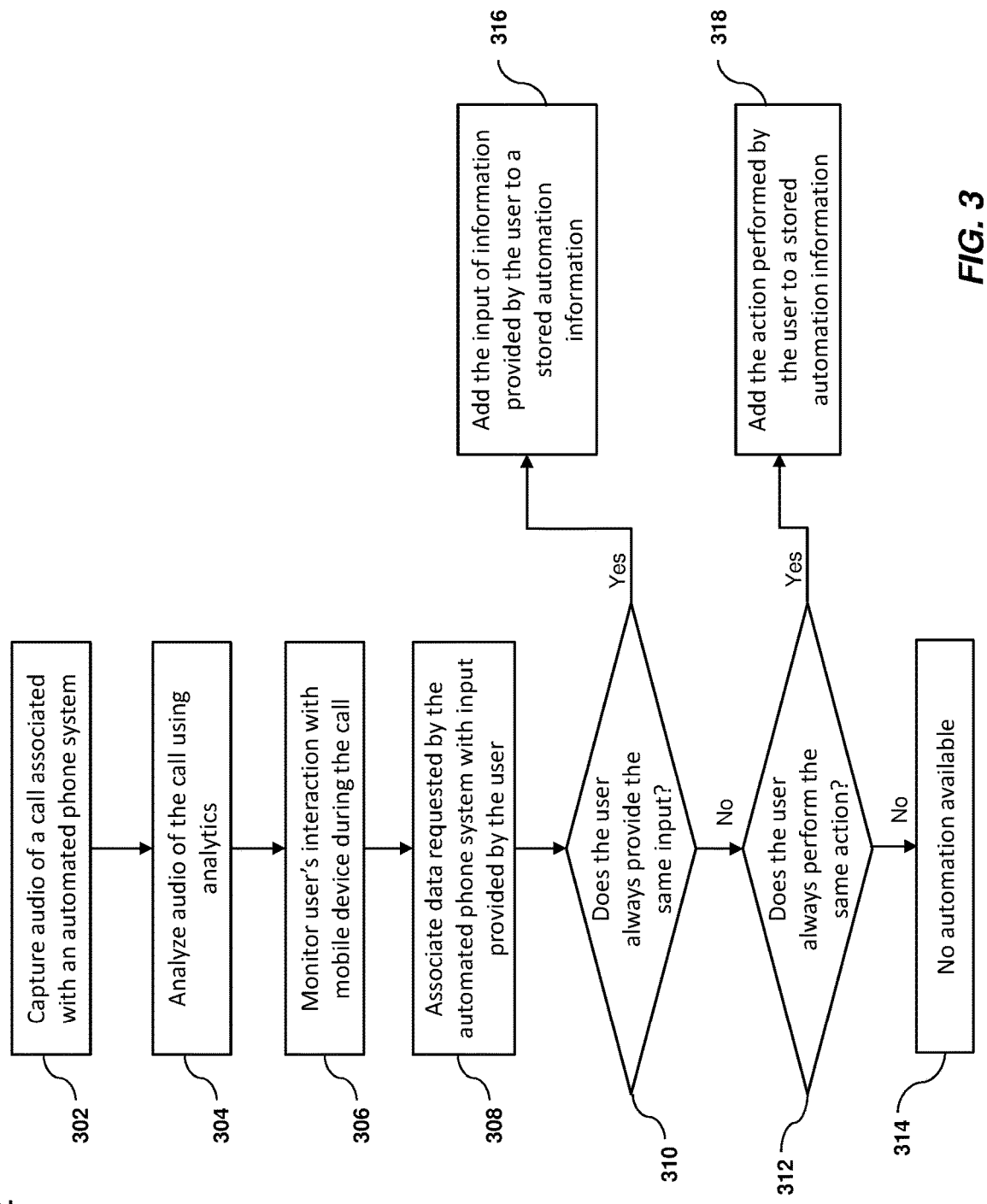
FIG. 3 depicts a flow diagram of a method for creating automation information for a call with an automated phone system in accordance with an embodiment.

Referring now to FIG. 3, an embodiment of a method 300 for creating automation information for a call with an automated phone system is shown. As illustrated at block 302, the method 300 includes capturing audio of a call associated with an automated phone system. Next, as shown at block 304, the method 300 includes analyzing the audio of the call using analytics. The method 300 also includes monitoring the user's interactions with the mobile device during the call, as shown at block 306. Next, as shown at block 308, the method 300 includes associating data requested by the automated phone system with input provided by the user.

Continuing with reference to FIG. 3, the method 300 includes determining if the user always provides the same input to the automated phone system, as shown at decision block 310. For example, the user may always enter the same access code upon dialing into a teleconference number or may always enter the same account number when connected to an automated phone system of a bank or utility provider. If it is determined that the user always provides the same input to the automated phone system, the method 300 proceeds to block 316 and adds the input of information provided by the user to the stored automation information.

The method 300 also includes determining if the user always performs an action during a call with the automated phone system, as shown at decision block 312. For example, the user may always open an application on the mobile device during a call with the automated phone system and may navigate through the application to obtain data from the application that is then provided to the automated phone system. If it is determined that the user always performs an action during a call with the automated phone system, the method 300 proceeds to block 318 and adds the action performed by the user to the stored automation information. If it is determined that the user does not always take the same action or provide the same input, the method 300 proceeds to block 314 and no automation information is stored.

Figure 4:
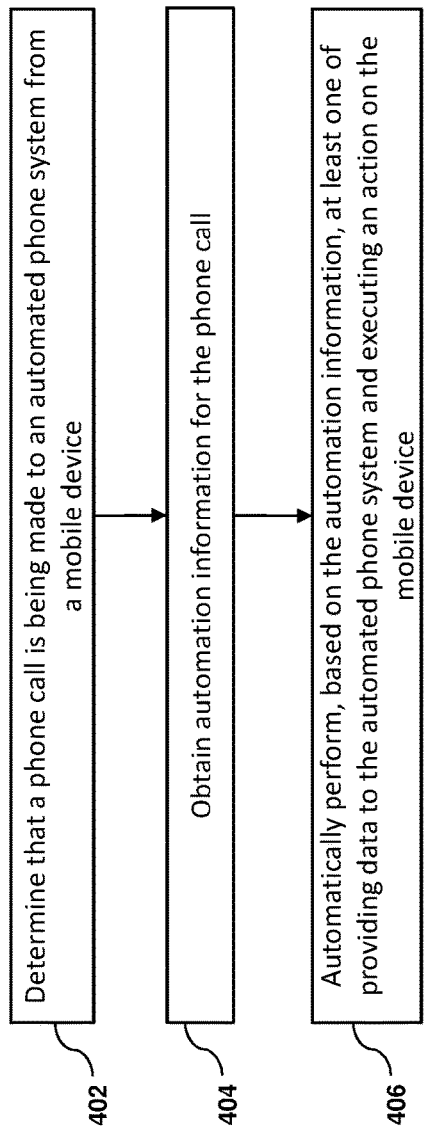
FIG. 4 depicts a flow diagram of a method for automating actions of a mobile device during a call with an automated phone system in accordance with an embodiment.

Referring now to FIG. 4, an embodiment of a method 400 for automating actions of a mobile device during a call with an automated phone system is shown. As illustrated at block 402, the method 400 includes determining that a phone call is being made to the automated phone system from the mobile device. In one embodiment, the determination that a phone call is being made to the automated phone system is made using a method such as the one shown in FIG. 2. In exemplary embodiments, the determination that the phone call is being made to the automated phone system is based at least in part upon a phone number dialed for the phone call.

Next, as shown at block 404, the method 400 includes obtaining automation information for the phone call. In exemplary embodiments, the automation information is created by monitoring data provided to the automated phone system by a user of the mobile device during one or more previous calls to the automated phone system. In one embodiment, the obtained automation information is created using a method such as the one shown in FIG. 3. The method 400 also includes automatically performing at least one of providing data to the automated phone system and executing an action on the mobile device based at least in part on the automation information.

In one embodiment, executing the action on the mobile device includes changing a display of the mobile device to be a data input screen. Upon connection to a call, most mobile devices change the display of the mobile device to a screen that allows a user to mute the call, hang up the call, change audio device for the call, etc. As a result, if the user wants to enter a passcode after a call is connected, the user must first change the display screen to be a data input screen suitable for entering the desired passcode. In exemplary embodiments, the mobile device utilizes the automation information to automatically change the display of the mobile device to be a data input screen to facilitate faster input of a passcode or other information by the user.

In one embodiment, executing the action on the mobile device includes opening an application on the mobile device. Often a user obtains information from an application on his mobile device that is then provided to the automated phone system. This requires the user to navigate to the application, open the application, and navigate within the application to the desired data. In exemplary embodiments, these functions are automatically performed by the mobile device upon a determination that the user is connected to a known automated phone system. In addition, the mobile device can automatically copy the desired data from the application to a clipboard. In one embodiment, the data obtained from the application can then be automatically transmitted to the automated phone system. In another embodiment, it can be presented to the user to allow the user to transmit the data with a single click.

In exemplary embodiments, the automation information is configured to store one or more of actions and data that have been previously provided by the user to the automated phone system. In one embodiment, the automated information is associated with a phone number for the automated phone system and also includes additional information that is used to determine what actions to take and/or which data values to provide. In one embodiment, the determination of which actions to take and/or which data values to provide can be further based upon a time that the phone call was made, an identity of the user of the mobile device and the like. In one example, a user may call into the same conference line at different times of the day but may use different access codes based upon the meeting time. Likewise, if the mobile device is a shared device between multiple family members, the identity of the user can be used to determine which actions to take and/or which data values to provide. The identity of the user can be obtained using biometrics of the user via a variety of sensors on the mobile device.

In one embodiment, a user places a call to a teleconference line every weekday at 9:30 am. Based on the audio metadata from previous call, it was previously determined that the phone number associated with the teleconference line is an automated phone system. An analysis of the call audio identifies that the automated phone system requests that the user provide a participant code and that in response the user utilizes a keypad to enter the same participant code every day. As a result, the next time that the user dials into the teleconference line at 9:30 am, the mobile device will automatically transmit the stored participant code. Optionally, the mobile device may present the user with an option to transmit the stored participant code rather than automatically transmitting it. In exemplary embodiments, the analysis of the call audio can include, among other things, performing speech-to-text and natural language understanding to the call audio.

Continuing with the above example, if the user calls the same teleconference line at 2:00 pm, rather than 9:00 am. The mobile device still knows that this number is associated with an automated phone system and that it requires a participant code. In exemplary embodiments, the mobile device understands what a participant code looks like and that the participant codes are often found in meeting information stored in a calendar application. As a result, the mobile device can automatically open the calendar application, the participant codes, and automatically transmit the participant code to the automated phone system. In exemplary embodiments, the mobile device learned where to get a participant code (e.g. your calendar app at this specific hour) by monitoring the user interactions with the mobile device.

In another embodiment, a user calls a utility provider once a month to give or provide meter readings. The utility provider has an automated phone system requires the user to enter an account number, a password and then presents a series of menus that must be navigated so that the user can enter the meter readings. In exemplary embodiments, the mobile device of the user is configured to automatically transmit the account number and the password at the appropriate time during the call.

Technical effects and benefits include the ability for a mobile device to automate actions that are traditionally performed by a user based on a determination that the user has called an automated phone system. As a result, the usability and utility of the mobile device are improved. In addition, the need for the user to interact with the display of the device during the phone calls to automated phone systems is decreased.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automating actions of a mobile device during a call with an automated phone system, the method comprising:
    determining that a phone call is being made to the automated phone system from the mobile device, wherein the determination that the phone call is being made to the automated phone system is based at least in part upon a phone number dialed for the phone call;
    obtaining automation information for the phone call, wherein the automation information is created by monitoring data provided to the automated phone system by a user of the mobile device during one or more previous calls to the automated phone system; and
    based at least in part on the automation information, automatically performing at least one of providing data to the automated phone system and executing an action on the mobile device.

2. The computer-implemented method of claim 1, wherein the determination that the phone call is being made to the automated phone system is based at least in part upon a determination that an audio metadata captured during the phone call is identical to the audio metadata captured during a previous call associated with the phone number.

3. The computer-implemented method of claim 2, wherein the audio metadata includes a tone, a pitch, a cadence and a volume of the audio as a function of time.

4. The computer-implemented method of claim 1, wherein executing the action on the mobile device includes changing a display of the mobile device to be a data input screen.

5. The computer-implemented method of claim 1, wherein executing the action on the mobile device includes opening an application on the mobile device.

6. The computer-implemented method of claim 5, wherein executing the action on the mobile device further includes copying data from the application on the mobile device to a clipboard.

7. The computer-implemented method of claim 1, wherein the data provided to the automated phone system is obtained from the automation information.

8. The computer-implemented method of claim 7, wherein the data provided to the automated phone system is determined at least in part based upon a time that the phone call is placed.

9. A computer program product for automating actions of a mobile device during a call with an automated phone system, the computer program product comprising:
    a computer readable storage medium having program instructions embodied therewith, wherein the computer readable storage medium is not a signal, the program instructions readable by a processing circuit to cause the processing circuit to:
    determine that a phone call is being made to the automated phone system from the mobile device, wherein the determination that the phone call is being made to the automated phone system is based at least in part upon a phone number dialed for the phone call;
    obtain automation information for the phone call, wherein the automation information is created by monitoring data provided to the automated phone system by a user of the mobile device during one or more previous calls to the automated phone system; and
    based at least in part on the automation information, automatically perform at least one of providing data to the automated phone system and executing an action on the mobile device.

10. The computer program product of claim 9, wherein the determination that the phone call is being made to the automated phone system is based at least in part upon a determination that an audio metadata captured during the phone call is identical to the audio metadata captured during a previous call associated with the phone number.

11. The computer program product of claim 10, wherein the audio metadata includes a tone, a pitch, a cadence and a volume of the audio as a function of time.

12. The computer program product of claim 9, wherein executing the action on the mobile device includes changing a display of the mobile device to be a data input screen.

13. The computer program product of claim 9, wherein executing the action on the mobile device includes opening an application on the mobile device.

14. The computer program product of claim 13, wherein executing the action on the mobile device further includes copying data from the application on the mobile device to a clipboard.

15. A mobile device for performing a processing action, the mobile device comprising:
    a touch sensor configured to receive an input from a user; and
    a processing device configured to:
    determine that a phone call is being made to an automated phone system from the mobile device, wherein the determination that the phone call is being made to the automated phone system is based at least in part upon a phone number dialed for the phone call;
    obtain automation information for the phone call, wherein the automation information is created by monitoring data provided to the automated phone system by a user of the mobile device during one or more previous calls to the automated phone system; and
    based at least in part on the automation information, automatically perform at least one of providing data to the automated phone system and executing an action on the mobile device.

\* \* \* \* \*